(12) United States Patent
Itoh

(10) Patent No.: US 7,933,340 B2
(45) Date of Patent: Apr. 26, 2011

(54) COMMUNICATIONS SYSTEM, RECEIVER APPARATUS, TRANSMISSION MODE PROPOSAL METHOD, AND PROGRAM

(75) Inventor: Katsutoshi Itoh, Tokyo (JP)

(73) Assignee: Sony Corporation, Tokyo (JP)

( * ) Notice: Subject to any disclaimer, the term of this patent is extended or adjusted under 35 U.S.C. 154(b) by 899 days.

(21) Appl. No.: 11/758,093

(22) Filed: Jun. 5, 2007

(65) Prior Publication Data

US 2008/0002790 A1   Jan. 3, 2008

(30) Foreign Application Priority Data

Jun. 5, 2006 (JP) ................................ 2006-155554

(51) Int. Cl.
 *H04L 27/00* (2006.01)
 *H04B 7/00* (2006.01)
(52) U.S. Cl. .................. 375/259; 455/67.13; 455/69

(58) Field of Classification Search .................. 375/219, 375/221, 225, 227, 259, 261, 316, 340; 455/500, 455/501, 67.11, 67.13, 69
See application file for complete search history.

(56) References Cited

U.S. PATENT DOCUMENTS

| | | | |
|---|---|---|---|
| 2004/0120411 A1* | 6/2004 | Walton et al. | 375/260 |
| 2004/0184398 A1* | 9/2004 | Walton et al. | 370/203 |
| 2005/0099975 A1* | 5/2005 | Catreux et al. | 370/329 |
| 2006/0114858 A1* | 6/2006 | Walton et al. | 370/335 |
| 2007/0147414 A1* | 6/2007 | Niu et al. | 370/465 |

FOREIGN PATENT DOCUMENTS

JP    2004-064797    2/2004

* cited by examiner

*Primary Examiner* — Young T. Tse
(74) *Attorney, Agent, or Firm* — Finnegan, Henderson, Farabow, Garrett & Dunner, L.L.P.

(57) ABSTRACT

A communications system has a transmission apparatus for transmitting a signal and a reception apparatus for receiving the signal. The reception apparatus includes: a transmission mode table; a propagation path condition detecting block; a transmission mode extraction block; a threshold adjustment block; and a transmission mode proposal block.

13 Claims, 12 Drawing Sheets

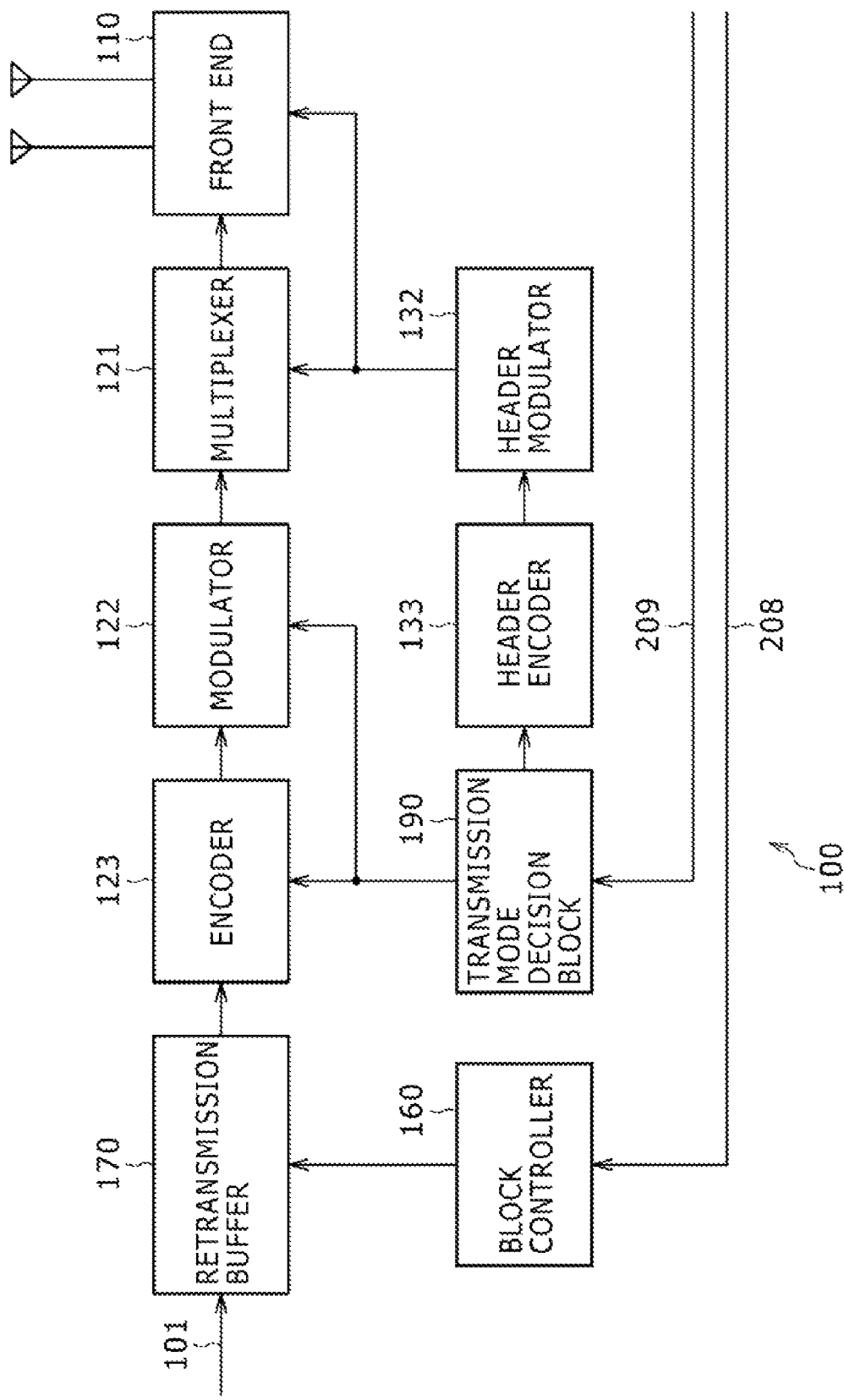

FIG.4

| INDEX | STREAM #1 | | STREAM #2 | |
|---|---|---|---|---|
| | CODING RATIO | MODULATING | CODING RATIO | MODULATING |
| 0 | R=1/2 | BPSK | NULL | |
| 1 | R=1/2 | QPSK | | |
| 2 | R=3/4 | QPSK | | |
| 3 | R=1/2 | 16QAM | | |
| 4 | R=3/4 | 16QAM | | |
| 5 | R=1/2 | BPSK | R=1/2 | BPSK |
| 6 | R=1/2 | QPSK | R=1/2 | BPSK |
| 7 | R=1/2 | 16QAM | R=1/2 | BPSK |
| 8 | R=3/4 | 16QAM | R=1/2 | BPSK |
| 9 | R=1/2 | QPSK | R=1/2 | QPSK |
| 10 | R=1/2 | 16QAM | R=1/2 | QPSK |
| 11 | R=3/4 | 16QAM | R=1/2 | QPSK |
| ⋮ | ⋮ | ⋮ | ⋮ | ⋮ |
| 31 | R=3/4 | 16QAM | R=3/4 | 16QAM |

REQUIRED SNR INCREASE ↓

FIG.10

| RECEPTION SUCCESS/ FAIL FLAG (610) | PACKET NO. (620) | DATA (630) |
|---|---|---|
| 0 | 901 | DATA#901 |
| 1 | 902 | DATA#902 |
| 1 | 903 | DATA#903 |
| 1 | 904 | DATA#904 |
| 1 | 905 | DATA#905 |
| 1 | 906 | DATA#906 |
| 1 | 907 | DATA#907 |
| 1 | 908 | DATA#908 |

COMMUNICATIONS SYSTEM, RECEIVER APPARATUS, TRANSMISSION MODE PROPOSAL METHOD, AND PROGRAM

CROSS REFERENCES TO RELATED APPLICATIONS

The present invention contains subject matter related to Japanese Patent Application JP 2006-155554 filed in the Japan Patent Office on Jun. 5, 2006, the entire contents of which being incorporated herein by reference.

BACKGROUND OF THE INVENTION

1. Field of the Invention

The present invention relates to a communications system and, more particularly, to a communications system in which a transmission mode (modulating and coding ratio) in a transmitter apparatus is proposed by a receiver apparatus and a processing method therefor, and a computer program for having a computer execute this method.

2. Description of the Related Art

With communications apparatuses based on wireless LAN (Local Area Network) and mobile communication, for example, sol-called adaptive transmission is proposed in which transmission modes are dynamically changed over in accordance with propagation path situations so as to enhance transmission efficiency. In this adaptive transmission, transmission modes, such as modulation schemes and coding ratios, change in accordance with propagation path situations. If the MIMO (Multiple Input Multiple Output) scheme is applied, the number of streams is also included in the transmission modes.

The methods of determining a transmission mode in the adaptive transmission is largely classified into (1) a method of determination on the sender side and (2) a method of determination on the receiver side. In the former, the receiver side feeds back channel quality to the sender side. In this case, generally, the quantity of information to be fed back is relatively large, so that transmission efficiency is low. In the latter, only a finite number of transmission modes may be specified on the basis of the propagation path characteristic observed at the receiver side, so that the quantity of information to be fed back is relatively small.

The IEEE (Institute of Electrical and Electronic Engineers) 802.11n standard of wireless LAN and the HSDPA (High Speed Downlink Packet Access) standard of mobile communication use the latter method. However, each transmission mode proposed by the receiver side does not reflect the conditions of the sender side and therefore the sender side does not always use a transmission mode proposed by the receiver side. Namely, each transmission mode fed back from the receiver side provides nothing but a recommended value.

On the other hand, in the selection of a transmission mode by the receiver side, it is a general practice that the quality of a communications path is observed and, of the transmission modes satisfying a certain error ratio, the one having the highest data transfer rate is selected. However, processing delay, change of propagation path characteristic, estimated error, and deficiency of observable channel information, for example, do not make complete the selection criteria, thereby requiring the correction of the transmission mode decision criteria by use of a post-event phenomenon, such as a received packet error ratio, for example. For more information, refer to Japanese Patent Laid-open No. 2004-64797 (FIG. 8).

SUMMARY OF THE INVENTION

In the above-mentioned related-art technology, a base station (the sender side) adjusts transmission modes in accordance with whether the reception has been successfully made at a user apparatus (the receiver side).

However, a transmission mode proposed by the receiver side does not always match a transmission mode determined by the transmission mode for actual use, so that it is possible for the correction not to be made sufficiently. In addition, from the viewpoint of QoS (Quality of Service), the related-art technology is effective for the adjustment of a transmission mode in accordance with a required error ratio of the data to be transmitted, but, because this requires a long-term observation, the related-art technology presents a problem of the inability of following a quick propagation path condition.

Therefore, the present invention addresses the above-identified and other problems associated with related-art methods and apparatuses and solves the addressed problems by adjusting the measure for transmission mode selection so as to accurately follow the change of propagation path condition.

In carrying out the invention and according to a first embodiment thereof, there is provided a reception apparatus. This reception apparatus has a transmission mode table for holding, as transmission modes, a plurality of combinations of a modulating scheme and a coding ratio to be applied to the signal transmitted from the transmission apparatus, and a propagation path condition detecting block for detecting a condition of propagation path with the transmission apparatus. The reception apparatus further has a transmission mode extraction block for extracting a transmission mode transmitted from the transmission apparatus, and a threshold adjustment block for adjusting a threshold value of the propagation path condition at the time of selecting a transmission mode to be proposed next in accordance with a difference between the extracted transmission mode and a transmission mode proposed last. The reception apparatus still further has a transmission mode proposal block for selecting a proper transmission mode from among transmission modes held in the transmission mode table on the basis of a relation between the propagation path condition and the threshold value and proposing the selected transmission mode to the transmission apparatus. The above-mentioned novel configuration brings about an advantageous effect of adjusting a threshold value of the condition of propagation path at the time of selecting a transmission mode to be proposed next in accordance with a difference between the transmission mode proposed last and the transmission mode actually used.

In the above-mentioned first embodiment, the above-mentioned reception apparatus further has a payload reception determination block for determining a reception status of a payload part of the signal transmitted from the transmission apparatus, wherein the threshold adjustment block decreases the threshold value by a predetermined level if, when the reception of the payload part is successful, the transmission mode extracted by the transmission mode extraction block is faster than the transmission mode proposed by the transmission mode proposal block, and increases the threshold value by a predetermined level, if, when the reception of the payload part fails, the transmission mode extracted by the transmission mode extraction block is not faster than the transmission mode proposed by the transmission mode proposal block. Consequently, if the propagation path condition is found better than expected, a transmission mode of a higher transfer rate is selected, while, if the propagation path condition is found worse than expected, a more reliable transmission mode is selected.

In the above-mentioned first embodiment, the above-mentioned reception apparatus further has a header reception determination block for determining the reception status of the header part for a signal transmitted from the above-mentioned transmission apparatus, wherein the threshold adjust, if the reception of the header part fails, adjust the threshold value regardless of the reception status of the payload part.

In carrying out the invention and according to a second embodiment thereof, there is provided a reception apparatus. This reception apparatus has a transmission mode table for holding, as transmission modes, a plurality of combinations of a modulating scheme and a coding ratio to be applied to the signal transmitted from the transmission apparatus, and a propagation path condition detecting block for detecting a condition of propagation path with the transmission apparatus. The reception apparatus further has a retransmission probability prediction block for predicting a probability of retransmission of a signal to be transmitted next from a reception log of signals transmitted from the transmission apparatus, and a threshold adjustment block for adjusting a threshold of the propagation path condition at the time of selecting a transmission mode to be proposed next on the basis of the retransmission probability. The reception apparatus further has a transmission mode proposal block for selecting a proper transmission mode from among transmission modes held in the transmission mode table on the basis of a relation between the propagation path condition and the threshold value and proposing the selected transmission mode to the transmission apparatus. This novel configuration brings about an advantageous effect of adjusting a threshold value of the propagation path condition at the time of selecting a transmission mode to be propsosed next in accordance with a retransmission probability predicted from a reception log of signals transmitted from the above-mentioned transmission apparatus.

In the above-mentioned second embodiment, the retransmission probability prediction block predicts the retransmission probability with reference to an error ratio in units of a predetermined block of a signal transmitted from the transmission apparatus. Consequently, the management to be executed in units of block can be reflected onto the prediction processing of retransmission probability.

In the above-mentioned second embodiment, if the retransmission probability is found higher than a predetermined level, the threshold adjustment block increases the threshold value. Consequently, if the retransmission probability is high, a more reliable transmission mode is selected. In addition, the above-mentioned reception apparatus has a buffer for holding a signal from the transmission apparatus into each entry in accordance with a transmission sequence, wherein, if the retransmission probability is found not higher than a predetermined ratio but if the number of continuous entries in a queue to be released in the buffer is higher than a predetermined number, then the threshold adjustment block increases the threshold value. Consequently, if the retransmission probability is low, a more reliable transmission mode is selected if it is estimated that many entries of the buffer will be released.

As described and according to the invention, excellent effects that the index for the selection of a transmission mode so as to correctly follow changes of propagation path conditions is adjusted can be provided.

BRIEF DESCRIPTION OF THE DRAWINGS

Other embodiments of the invention will become apparent from the following description of embodiments with reference to the accompanying drawings in which:

FIG. 2 is a block diagram illustrating an exemplary configuration of a communications apparatus of a sender side in the above-mentioned embodiment of the invention;

FIG. 4 is a diagram illustrating an exemplary configuration of a transmission mode table in the above-mentioned embodiment of the invention;

FIG. 10 is a diagram illustrating an exemplary configuration of a sort buffer in the above-mentioned embodiment of the invention;

DETAILED DESCRIPTION OF THE PREFERRED EMBODIMENTS

This invention will be described in further detail by way of embodiments thereof with reference to the accompanying drawings.

Figure 1A:
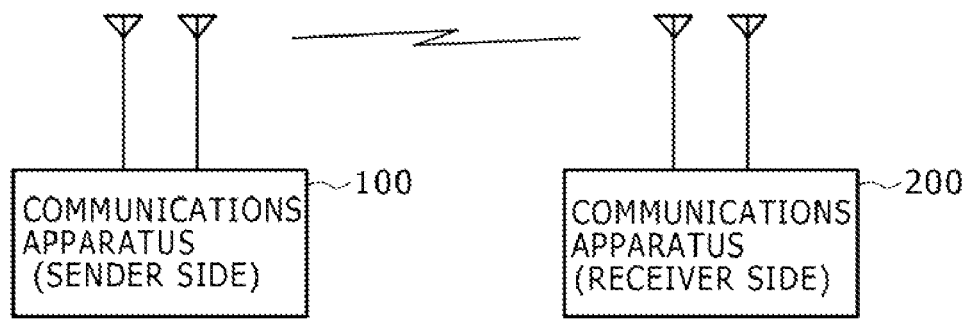
FIGS. 1A and 1B are schematic diagrams illustrating an exemplary overall configuration of a communications system practiced as one embodiment of the invention.
Figure 1B:
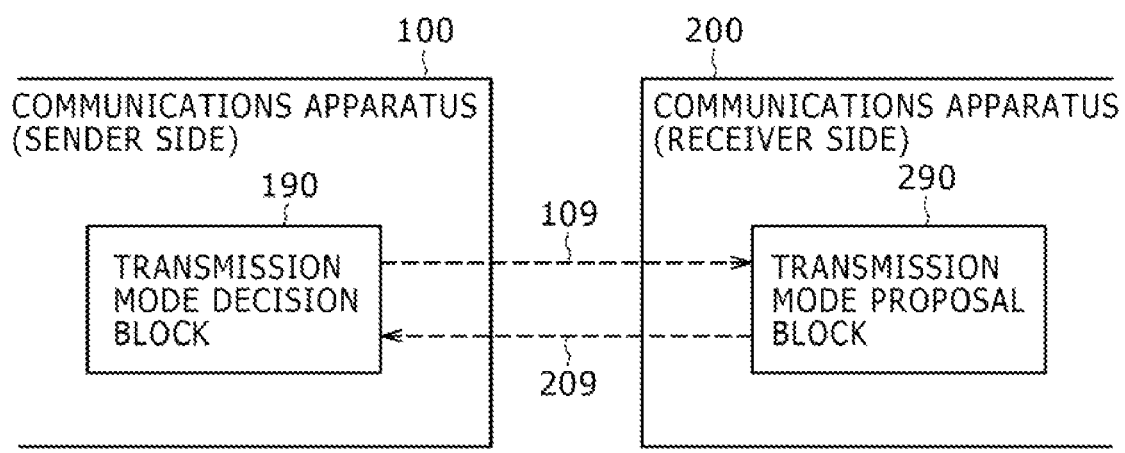

Now, referring to FIG. 1, there is shown an exemplary overall configuration of a communications system practiced as one embodiment of the invention. This communications system is composed of at least two units of communications apparatuses. FIG. 1A shows a system having at two communications apparatuses 100 and 200 as a minimum configuration. For the purpose of convenience, the communications apparatus 100 is on the sender side and the communications apparatus 200 is on the receiver side; actually, however, these two apparatuses are substantially the same in configuration because each executes both transmission and reception.

It should be noted that, in the present embodiment of the invention, the communications apparatus 100 and the communications apparatus 200 are assumed to use the MIMO (Multiple Input Multiple Output) scheme. Namely, the communications apparatus 100 and the communications apparatus 200 each use a two or more antennas to execute communication through two or more propagation channels in space as propagation media.

As shown in FIG. 18, the communications apparatus 100 executes transmission in a transmission mode established in a transmission mode decision block 190. A transmission mode herein denotes a modulation scheme and a coding ratio to be used at the time of transmission. The above-mentioned MIMO scheme can use different modulation schemes and coding ratios for different streams (or propagation channels), so that each transmission mode includes the number of these streams and the contents (modulation scheme and coding ratio) thereof.

On the other hand, the communications apparatus 200 proposes, through a transmission mode proposal block 290, a transmission mode to be used in a next transmission, in accordance with a reception status of a signal 109 transmitted from the communications apparatus 100. The proposed transmission mode is sent to the communications apparatus 100 by means of the signal 209. Referencing the received transmission mode, the communications apparatus 100 determines, through the transmission mode decision block 190, the transmission mode for a next transmission. At this moment, because the transmission mode is determined in accordance with the status of the communications apparatus 100, the transmission mode proposed by the communications apparatus 200 is not always employed.

The signal 109 received from the communications apparatus 100 includes the transmission mode in which the signal 109 has been transmitted. The communications apparatus 200 extracts this transmission mode from the signal 109 to compare with the transmission mode proposed by the communications apparatus 200. A comparison result obtained is used for the proposal of a next transmission mode.

Referring to FIG. 2, there is shown an exemplary configuration of the communications apparatus 100 in the present embodiment. The communications apparatus 100 has a front end 110, a multiplexer 121, a modulator 122, a encoder 123, a header modulator 132, a header encoder 133, a block controller 160, a retransmission buffer 170, and the transmission mode decision block 190.

The retransmission buffer 170 is a buffer for holding transmission data 101 to be retransmitted if a transmission fails. The transmission data 101 held in the retransmission buffer 170 is supplied to the encoder 123.

The encoder 123 encodes the transmission data received from the retransmission buffer 170 into a predetermined code. In order to enhance the ruggedness against transmission error, the data of X bits become the data of Y bits after encoding. It should be noted that coding ratio R is represented by R=X/Y.

The modulator 122 modulates the data encoded by the encoder 123. In wireless communications applications, phase modulations, such as BPSK, 8-PSK, and QPSK, are generally used; it is also practicable to use combinations of phase modulation and amplitude modulation, such as 16-QAM and 64-QAM. For the brevity of description, it is assumed that the present embodiment have three modulation modes, BPSK, QPSK, and 16-QAM.

The front end 110 multiplexes the modulated data by the MIMO scheme and transmits the multiplexed data to a transmission path. The MIMO transmission makes the most of the characteristic of transmission path, establishing two or more independent paths to form independent data streams. For the brevity of description, the present embodiment assumes the MIMO schemes corresponding to two data streams. It should be noted that applicable are both MIMO schemes, "equiv-transmission mode MIMO" assuming the application of a same transmission mode to both data streams and "nonequiv-transmission mode MIMO" assuming the application of different transmission modes to different data streams.

The block controller 160 processes a retransmission request signal 208 to be fed back from the receiver side to delete the data reported normally received from the retransmission buffer 170. The data not normally received is let in the retransmission buffer 170 to be retransmitted. Here, BA (Block ACK) control is assumed in which successful reception (ACK) is managed for each block formed by two or more pieces of data to send a retransmission request to two or more packets after transmission or reception of two or more packets. This BA control is a transmission scheme for use in IEEE 802.11e/n, for example.

The transmission mode decision block 190 references a transmission mode 209 proposed by the receiver side to determine the transmission mode in the encoder 123 and the modulator 122. Here, it is practicable to select a transmission mode on the basis of an original measure obtained from a transmission path quality observed from the sender side and a free space condition of the retransmission buffer 170 rather than directly applying a transmission mode proposed by the receiver side. The transmission mode determined by the transmission mode decision block 190 is included in the header information.

The header encoder 133 encodes header information. The header modulator 132 modulates the header information encoded by the header encoder 133. The present embodiment of the invention assumes that a transmission mode of the header information be predetermined. The multiplexer 121 the time-multiplexes the header information and transmits the multiplexed header information before other data. With a channel-multiplexable system, such as a mobile communications system, the header information can also be transmitted on a separate channel.

Figure 3:
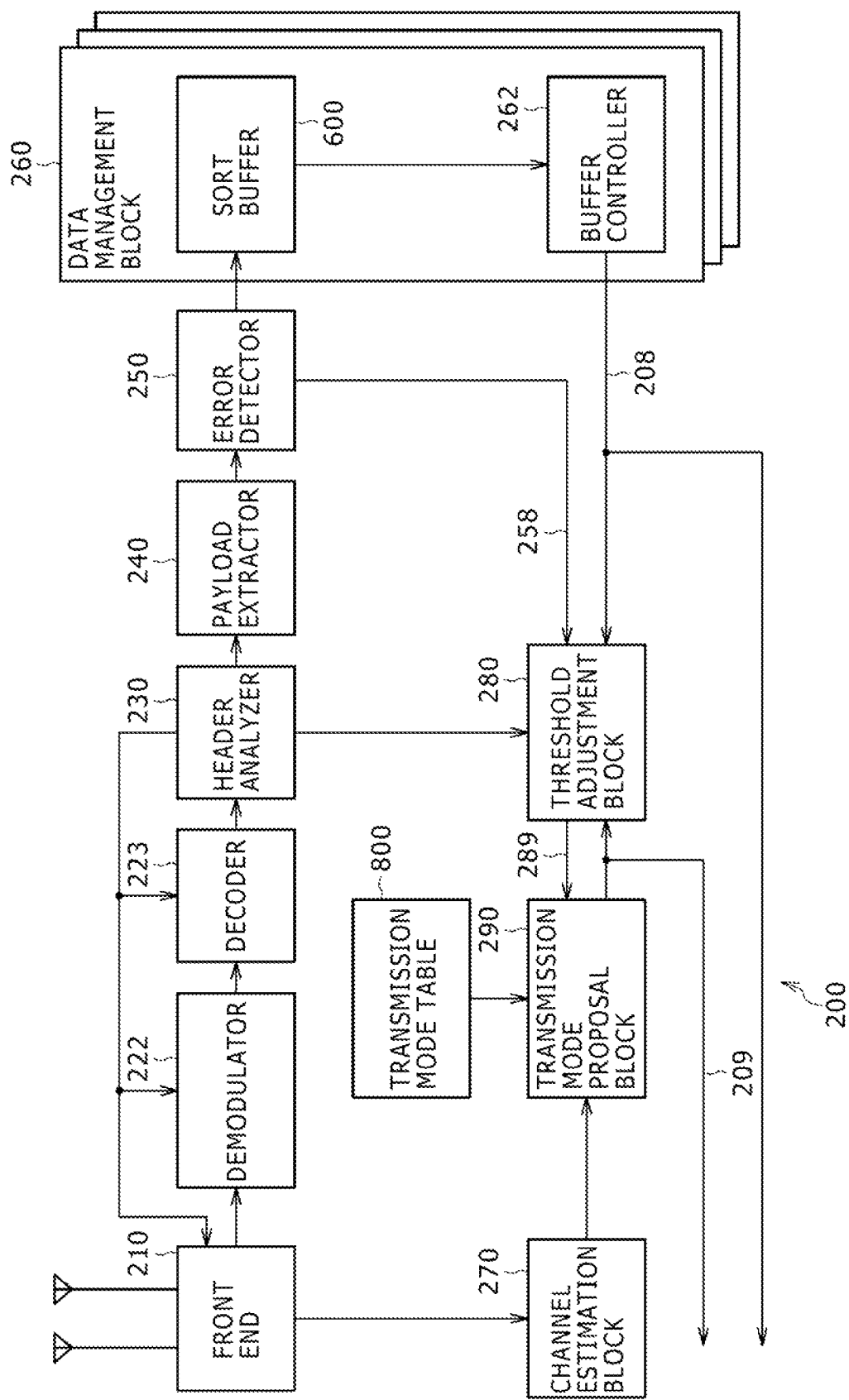
FIG. 3 is a block diagram illustrating a first exemplary configuration of a communications apparatus of receiver side in the above-mentioned embodiment of the invention.

Referring to FIG. 3, there is shown a first exemplary configuration of the communications apparatus 200 on the receiver side in the present embodiment. The communications apparatus 200 has a front end 210, a demodulator 222, a decoder 223, a header analyzer 230, a payload extractor 240, an error detector 250, a data management block 260, a channel estimation block 270, a threshold adjustment block 280, a transmission mode proposal block 290, and a transmission mode table 800.

The front end 210 receives a data signal from the communications apparatus 100 and resolves the received data signal for each stream. The demodulator 222 demodulates the stream data resolved for each stream. The decoder 223 decodes the demodulated signal. The header analyzer 230 extracts the transmission mode from the header signal of the decoded signal and analyzes the extracted signal. The front end 210, the demodulator 222, and the decoder 223 execute operations thereof in accordance with the transmission mode analyzed by the header analyzer 230.

The payload extractor 240 extracts a payload part except for the header information from the decoded signal. The error detector 250 executes data error check by use of a CRC (Cyclic Redundancy Check) code added to the data in the payload.

The channel estimation block 270 estimates the quality of each stream on the transmission path. It is assumed here that this quality be measured by SNR (Signal to Noise Ratio) for each stream. It should be noted that SNR can be estimated from a ratio of a signal component obtained by singular value decomposition of a signal observed from each antenna by use of a pilot signal to a noise component estimated from a swing from a known point of the pilot signal.

The data management block 260 manages the received data signals for each communications apparatus of sender side. The data management block 260 has a sort buffer 600 and a buffer controller 262 for each transmitting communications apparatus of sender side. The sort buffer 600 sorts the received packets in the order of transmission and holds a failed packet and subsequent packets. The buffer controller 262 feeds back information about successful reception (ACK) or failed reception (NACK) for each block (made up of 128 packets for example) to the transmitting side as the retransmission request signal 208.

The transmission mode table 800 holds combinations of transmission modes for all streams. The contents of the transmission mode table 800 will be described later.

The transmission mode proposal block 290 selects, on the basis of the SNR estimated by the channel estimation block 270, a proper transmission mode from among those held in the transmission mode table 800 and proposes the selected transmission mode to the communications apparatus 100. In selecting a transmission mode, the transmission mode proposal block 290 compares the SNR estimated by the channel estimation block 270 with a threshold value set for each transmission mode with reference to the SNR required for application of each transmission mode (hereafter referred to as a required SNR), thereby selecting a transmission mode having the highest required SNR of the transmission modes whose estimated SNRs are in excess of the threshold value. In transmission modes having higher required SNRs, the transmission is executed at higher transfer rates.

The threshold adjustment block 280 adjusts a threshold value to be used in the selection of a transmission mode by the transmission mode proposal block 290. The threshold adjustment block 280 compares the transmission mode proposed last by the transmission mode proposal block 290 with the transmission mode actually applied by the communications apparatus 100 and adjust the threshold value in accordance with a difference found by the comparison. A configuration of the threshold adjustment block 280 will be described later.

Referring to FIG. 4, there is shown an exemplary configuration of the transmission mode table 800 in the present embodiment. The transmission mode table 800 holds combinations of coding ratios 821 and 831 and modulating schemes 822 and 832 for two streams 820 and 830.

The combinations of transmission modes for the streams 820 and 830 are each attached with an index 810. The indexes 810 are arranged in the ascending order of required SNRs. Namely, as the index 810 gets higher, the required SNR of that transmission mode gets higher. On the other hand, as the index 810 gets lower, the required SNR of that transmission mode gets lower, thereby increasing the reliability of communication. In this example, the system is set that every time the index goes up or down by one, the required SNR goes up or down by about 3 dB.

For example, if the index 810 is zero, then the coding ratio of the stream 820 is R=1/2 and the modulating scheme is BPSK. On the other hand, the stream 830 is not use din this transmission mode. In this case, because the stream 820 is used alone, the transfer rate is not high, but the reliability of is high due to no inter-stream interference.

On the other hand, if the index 810 is 31 for example, then the transmission modes of the streams 820 and 830 are R=3/4 in coding ratio and 16 QAM in modulating scheme. In this case, because the streams 820 and 830 are simultaneously used, the transfer rate is high at the cost of a low assuredness caused by the tight communication.

In selecting a transmission mode, the transmission mode proposal block 290 compares the threshold attached to each index with the SNR estimated in the channel estimation block 270 to select a transmission mode having the highest required SNR of the transmission modes whose thresholds are in excess of the estimated SNR.

Figure 5A:
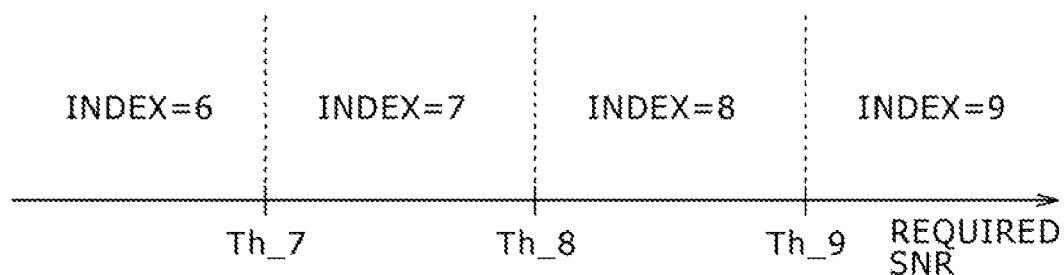
FIGS. 5A, 5B, and 5C are exemplary thresholds in the above-mentioned embodiment of the invention.
Figure 5B:
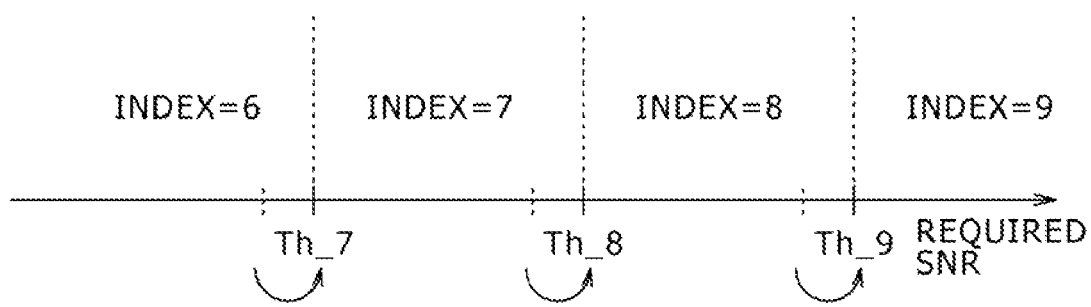
Figure 5C:
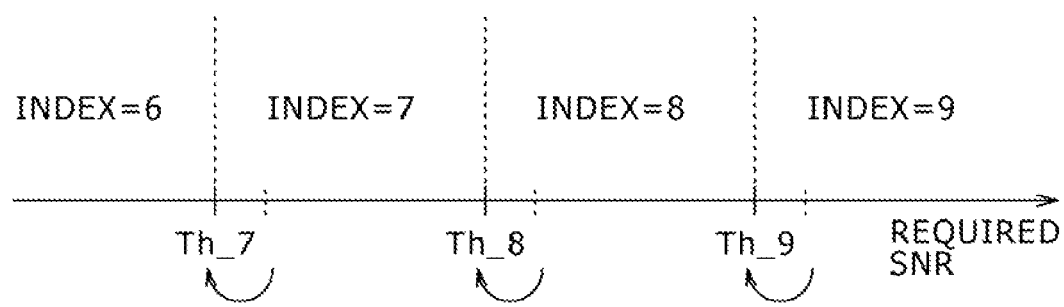

Referring to FIGS. 5A through 5C, there are shown examples of threshold values in the present embodiment. As shown in FIG. 5A, a threshold value is set for each transmission mode with reference to required SNR. In the figure, the required SNR increases in the right direction. For example, if the SNR estimated by the channel estimation block 270 is equal to or greater than threshold value Th_8 and smaller than threshold value Th_9, then the transmission mode whose index is 8 (refer to FIG. 4) is selected by the transmission mode proposal block 290.

This threshold value is adjusted by the threshold adjustment block 280. If the threshold value is adjusted in the direction in which the required SNR increases as shown in FIG. 5B, then it becomes likely for those transmission modes which have smaller indexes than those before change to be selected. Namely, those transmission modes which are high in assuredness and conservative. For example, if the estimated SNR is slightly greater than threshold value Th_8 shown in FIG. 5A, then changing the threshold value in the direction in which the required SNR gets smaller as shown in FIG. 5B changes the index from 8 to 7, thereby causing a more conservative transmission mode to be selected.

On the other hand, if the threshold value is changed in the direction in which the required SNR gets smaller as shown in FIG. 5C, then it becomes likely for those transmission modes which have higher indexes than those before change to be selected. Namely, those transmission modes which are high in transfer rate are to be selected. For example, is the estimated SNR is slightly greater than threshold value Th_8 shown in FIG. 5A, then changing the threshold value in the direction in which the required SNR gets smaller as shown in FIG. 5C changes the index from 7 to 8, thereby causing a transmission mode higher in transfer rate to be selected.

Figure 6:
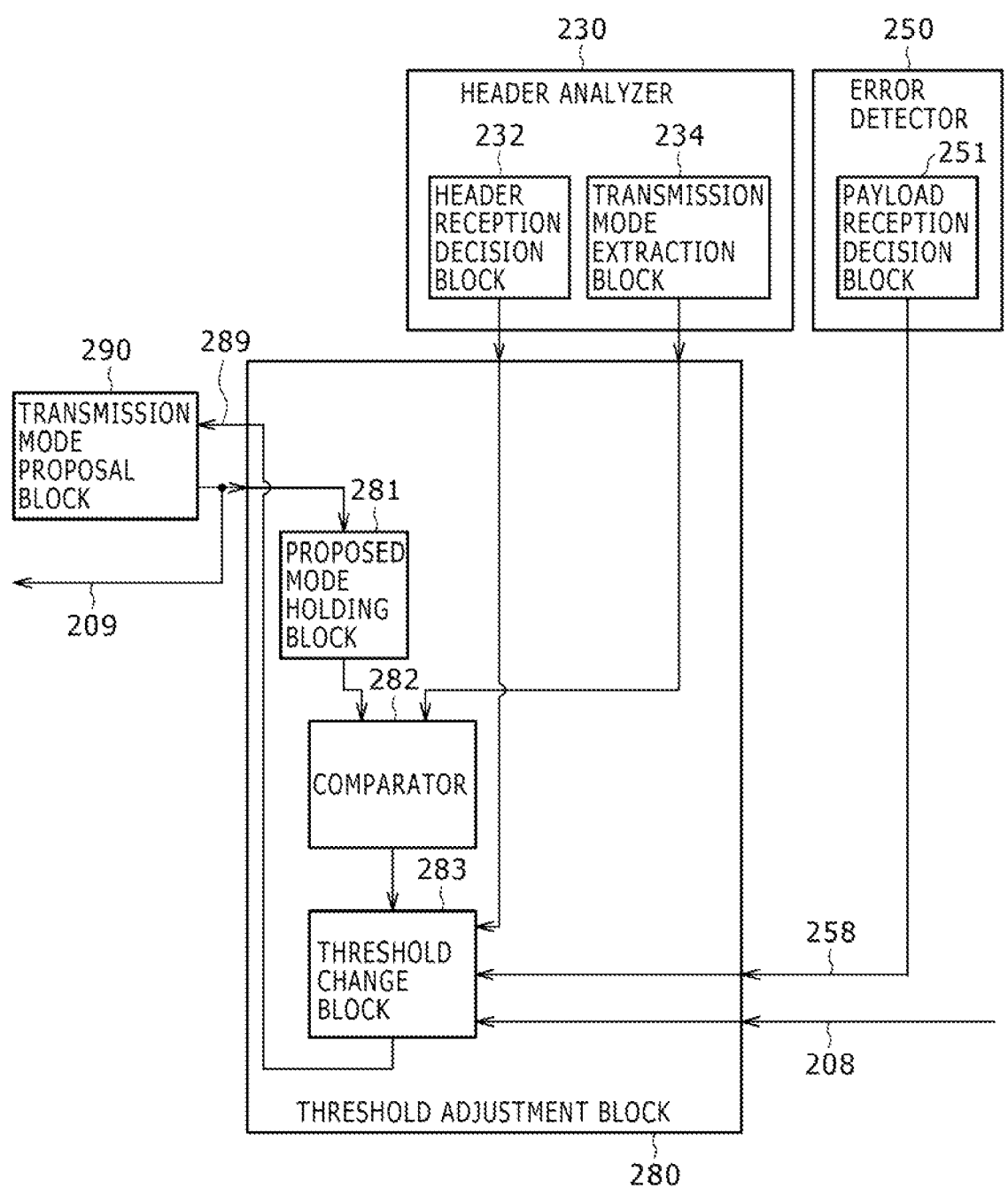
FIG. 6 is a block diagram illustrating the major part of the first exemplary configuration of the communications apparatus of the receiver side in the above-mentioned embodiment of the invention.

Referring to FIG. 6, there is shown a major part of an exemplary configuration of the communications apparatus 200 on the receiver side in the present embodiment of the invention. The header analyzer 230 has a header reception decision block 232 and a transmission mode extraction block 234. The error detector 250 has a payload reception decision block 251. The threshold adjustment block 280 has a proposed mode holding block 281, a comparator 282, and a threshold change block 283.

The header reception decision block 232 determines the reception status of header information of a data signal transmitted from the communications apparatus 100. Namely, the header reception decision block 232 determines whether or not the data signal has been received and, if the data signal is found received, then extracts the header information from the received data signal, thereby determining whether the reception of header information is successful or not. The result of this decision is supplied to the threshold change block 283 as a header reception result signal.

The transmission mode extraction block 234 extracts the transmission mode from the header information of the received data signal. Consequently, the transmission mode actually applied for the transmission of this data signal can be known. This extracted transmission mode is supplied to the comparator 282.

The payload reception decision block 251 determines the reception status of the payload part extracted by the payload extractor 240. Namely, the payload reception decision block 251 determines on the basis of a result of payload error correction whether or not the reception of that payload part is successful. The result of this decision is supplied to the threshold change block 283 as a payload reception result signal 258.

The proposed mode holding block 281 holds the transmission mode proposed last by the transmission mode proposal block 290. The comparator 282 compares the transmission mode held in the proposed mode holding block 281 with the transmission mode extracted by the transmission mode extraction block 234 to generate a difference in between. Namely, the comparator 282 compares the transmission mode proposed by the communications apparatus 200 to the communications apparatus 100 with the transmission mode actually used by the communications apparatus 100. For the difference generated at this moment, an index value described with reference to FIG. 4 may be used.

The threshold change block 283 changes the threshold value to be used in the selection of a transmission mode by the transmission mode proposal block 290 on the basis of the header reception result signal supplied from the header reception decision block 232, the payload reception result signal 258 supplied from the payload reception decision block 251, the retransmission request signal 208 supplied from the buffer controller 262, and the transmission mode difference signal supplied from the comparator 282. This threshold value is supplied to the transmission mode proposal block 290 over a signal line 289.

As described above, if the threshold value is set so as to make the required SNR become smaller, a transmission mode having a higher transfer rate is selected; if the threshold value is changed so as to make the required SNR become greater, then a conservative transmission mode is selected. Therefore, basically, if the condition of the propagation path is better than expected, the threshold change block 283 changes the threshold value so as to make the required SNR become smaller; if the condition of the propagation path is worse than expected, the threshold change block 283 changes the threshold value so as to make the required SNR become greater.

To be more specific, in the former case, expression (1) below is obtained.

$$Th \leftarrow Th - step\_size \times PER \quad (1)$$

In the latter case, expression (2) is obtained.

$$Th \leftarrow Th + step\_size \times (1-PER) \quad (2)$$

Where, Th denotes a threshold value, step_size denotes a change of index, and PER denotes a packet error ratio. For change of index step_size, the absolute value of a difference generated by the comparator 282 may be used. Packet error ratio PER may be obtained from the retransmission request signal 208 for each block supplied from the buffer controller 262.

However, if a response signal from the communications apparatus 100 is found not detected on the basis of the header reception result signal supplied from the header reception decision block 232, then the cause of this trouble may be estimated that a collision has occurred against a packet of another communication apparatus or there occurred an error in a packet fed back from the communications apparatus 200. Therefore, in this case, because the trouble is not in the field of adaptive transmission, the threshold adjustment block 280 does not execute threshold adjustment. However, in consideration of the QoS of the entire communications system, the threshold value may be changed so as to make the required SNR become slightly greater.

If the reception of header information is found failing on the basis of the header reception result signal supplied from the header reception decision block 232, then it may be estimated that a collision has occurred against a packet of another communications apparatus or the propagation path has deteriorated to a degree at which the header information cannot be received. Therefore, in this case, because the trouble is not in the field of adaptive transmission, the threshold adjustment block 280 does not execute threshold value adjustment. However, in consideration of the QoS of the entire communications system, the threshold value may be changed so as to make the required SNR become slightly greater.

If the reception of payload is found failing by checking the payload reception result signal 258 supplied from the payload reception decision block 251, then the subsequent processing depends on the result of the comparison by the comparator 282 as follows. If he index of the transmission mode actually used by the communications apparatus 100 is not greater than the index of the transmission mode proposed by the communications apparatus 200 to the communications apparatus 100, namely, if the actually used transmission mode is not faster than the proposed transmission mode, then it is estimated that the failure of the payload reception be caused by the propagation path condition worse than expected, upon which the threshold adjustment block 280 changes the threshold value so as to make the required SNR become higher (expression (2) above). On the other hand, if the index of the transmission mode actually used by the communications apparatus 100 is greater than the index of the transmission mode proposed by the communications apparatus 200 to the communications apparatus 100, namely, if the actually used transmission mode is faster than the proposed transmission mode, then this is supposed to be a problem of the transmission mode selection technique in the communications apparatus 100, so that the threshold adjustment block 280 does not execute threshold value adjustment. However, in consideration of the QoS of the entire communications system, the threshold value may be changed so as to make the required SNR become slightly higher.

If the payload reception is found successful by checking the payload reception result signal 258 supplied from the payload reception decision block 251, the subsequent processing depends on the result of the comparison by the comparator 282 as follows. If the index of the transmission mode actually used by the communications apparatus 100 is not greater than the index of the transmission mode proposed by the communications apparatus 200 to the communications apparatus 100, namely, if the actually used transmission mode is not faster than the proposed transmission mode, then the payload reception is supposed to be by necessity, and therefore the threshold adjustment block 280 does not execute threshold value adjustment. However, in consideration of the QoS of the entire communications system, the threshold value may be changed so as to make the required SNR become slightly smaller. On the other hand, if the index of the transmission mode actually used by the communications apparatus 100 is greater than the index of the transmission mode proposed by the communications apparatus 200 to the communications apparatus 100, namely, if the actually used transmission mode is faster than the proposed transmission mode, then the successful payload reception is supposed to be due to the better propagation path condition than expected, upon which the threshold adjustment block 280 changes the threshold value so as to make the required SNR become smaller (expression (1) above).

Figure 7:
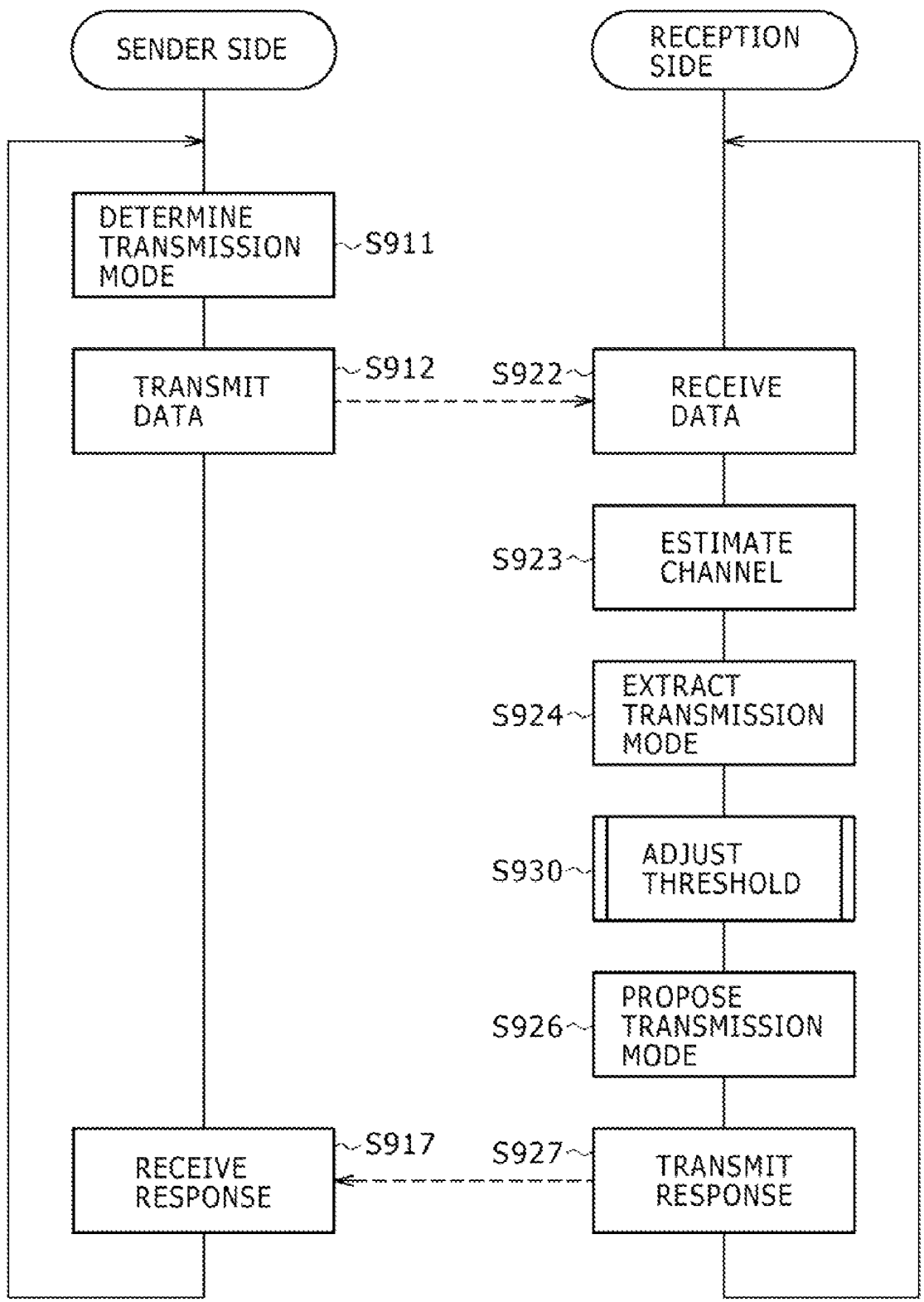
FIG. 7 is a flowchart indicative of an exemplary processing procedure of the communications system in the above-mentioned embodiment of the invention.

Referring to FIG. 7, there is shown a flowchart indicative of an exemplary processing procedure of the communications system in the present embodiment. The communications apparatus 100 on the sender side determines a transmission mode through the transmission mode decision block 190 (step S911) and transmits a data signal in the determined transmission mode (step S912). Next, the communications apparatus 100 receives a feedback signal from the communications apparatus 200 (step S917). This feedback signal includes the transmission mode proposed by the communications apparatus 200. In determining a next transmission mode (step S911), the transmission mode decision block 190 references this proposed transmission mode.

Receiving the data signal from the communications apparatus 100 (step S922), the communications apparatus 200 on the receiver side estimates a propagation path condition through the channel estimation block 270 (step S923) and extracts the transmission mode through the header analyzer 230 (step S924). Next, the threshold adjustment block 280 executes threshold value adjustment (step S930). In accordance with the adjusted threshold value, the transmission mode proposal block 290 selects a transmission mode (step S926). The selected transmission mode is included in the feedback signal to the communications apparatus 100 to be transmitted thereto (step S927).

Figure 8:
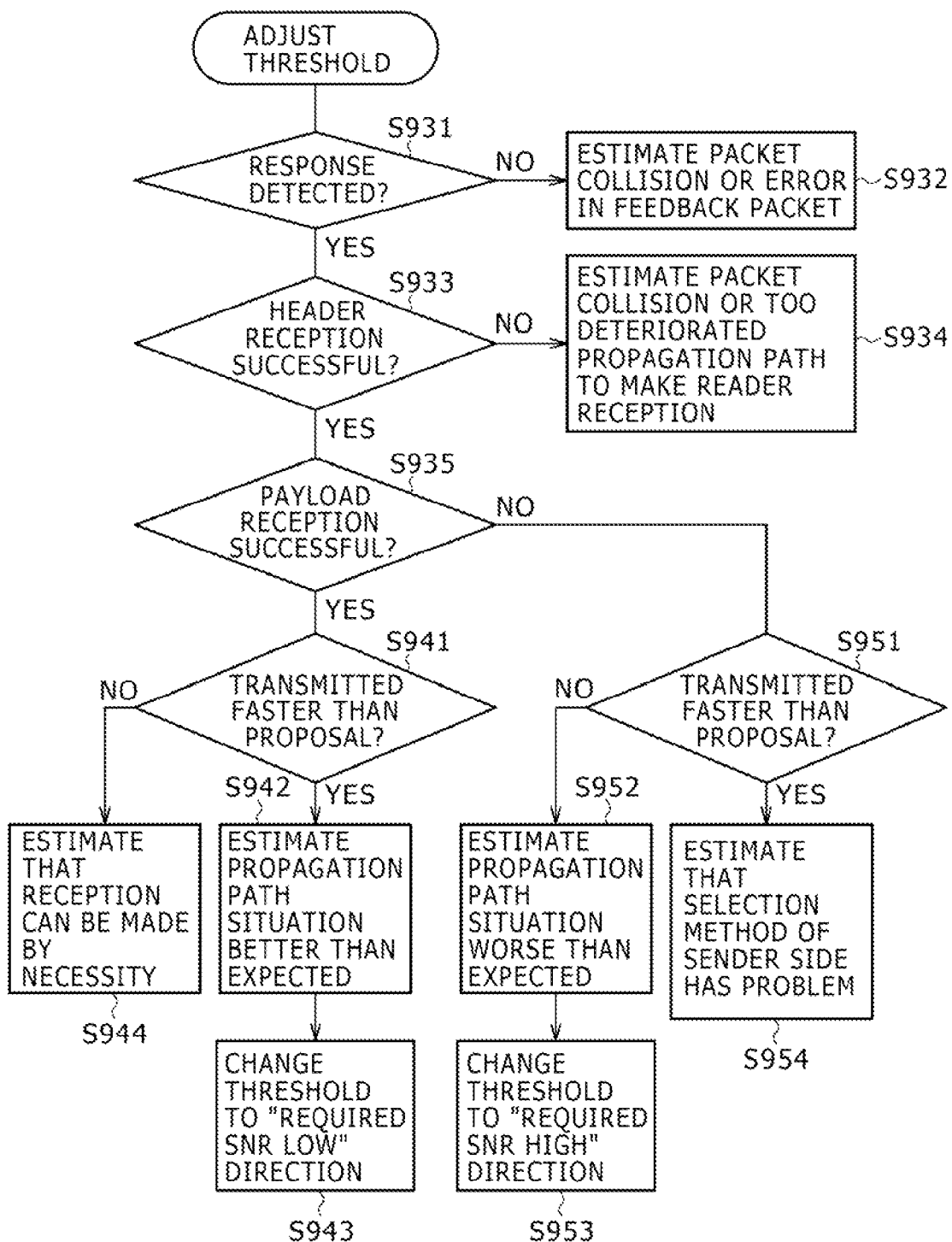
FIG. 8 is a flowchart indicative of an exemplary processing procedure of threshold adjustment in the above-mentioned embodiment of the invention.

Referring to FIG. 8, there is shown a flowchart indicative of an exemplary processing procedure of the threshold value adjustment (step S930) in the present embodiment. If a response signal from the communications apparatus 100 is found not detected by checking the header reception result signal supplied from the header reception decision block 232 (step S931), then it can be estimated that a collision has occurred against a packet of another communications apparatus or an error has occurred in a packet fed back from the communications apparatus 200 (step S932). In this case, because the trouble is not in the field of adaptive transmission, the threshold adjustment block 280 does not execute threshold value adjustment. However, in consideration of the QoS of the entire communications system, the threshold value may be changed so to make the required SNR become slightly greater.

If the reception of the header information is found failing by checking the header reception result signal supplied from the header reception decision block 232 (step S933), then it may be estimated that a collision has occurred against a packet of another communications apparatus or the propagation path has deteriorated to a degree at which the header information cannot be received (step S934). Therefore, in this case, because the trouble is not in the field of adaptive transmission, the threshold adjustment block 280 does not execute threshold value adjustment. However, in consideration of the QoS of the entire communications system, the threshold value may be changed so as to make the required SNR become slightly greater.

If the reception of the payload is found failing by checking the payload reception result signal 258 supplied from the payload reception decision block 251 (step S935). then, unless the transmission mode actually used by the communications apparatus 100 is faster than the transmission mode proposed by the communications apparatus 200 (step S951), it is estimated that the propagation path condition is worse than expected (step S952), upon which the threshold adjustment block 260 changes the threshold value so as to make the required SNR become slightly greater (step S953). On the other hand, if the transmission mode actually used by the communications apparatus 100 is faster than the transmission mode proposed by the communications apparatus 200 (step S951), it is estimated that the trouble is in the field of transmission mode selection method on the communications apparatus 100 (step S954), so that the threshold adjustment block 280 does not execute threshold value adjustment. However, in consideration of the QoS of the entire communications system, the threshold value may be changed so as to make the required SNR become slightly greater.

If the reception of the payload is found successful by checking the payload reception result signal 258 supplied from the payload reception decision block 251 (step S935), namely, if the transmission mode actually used by the communications apparatus 100 is not faster than the transmission mode proposed by the communications apparatus 200 (step S941), then the payload reception is supposed to be by necessity (step S944), and therefore the threshold adjustment block 280 does not execute threshold value adjustment. However, in consideration of the QoS of the entire communications system, the threshold value may be changed so as to make the required SNR become slightly smaller. On the other hand, if the transmission mode actually used by the communications apparatus 100 is greater than the transmission mode proposed by the communications apparatus 200 (step S941), then the successful payload reception is supposed to be due to the better propagation path condition than expected (step S942), upon which the threshold adjustment block 280 changes the threshold value so as to make the required SNR become smaller (step S943).

As described, according to the first exemplary configuration of the present embodiment, the threshold adjustment block 280 can adjust the threshold value each required SNR on the basis of the difference between the transmission mode proposed by the transmission mode proposal block 290 and the transmission mode actually used for transmission, thereby accurately following changes in propagation path conditions.

The following describes a second exemplary configuration of the communications apparatus of the present embodiment. An overall configuration and a communications apparatus 100 on the sender side are substantially the same as those shown above. In what follows, the description will be made by use of a communications apparatus 300 as an example.

Figure 9:
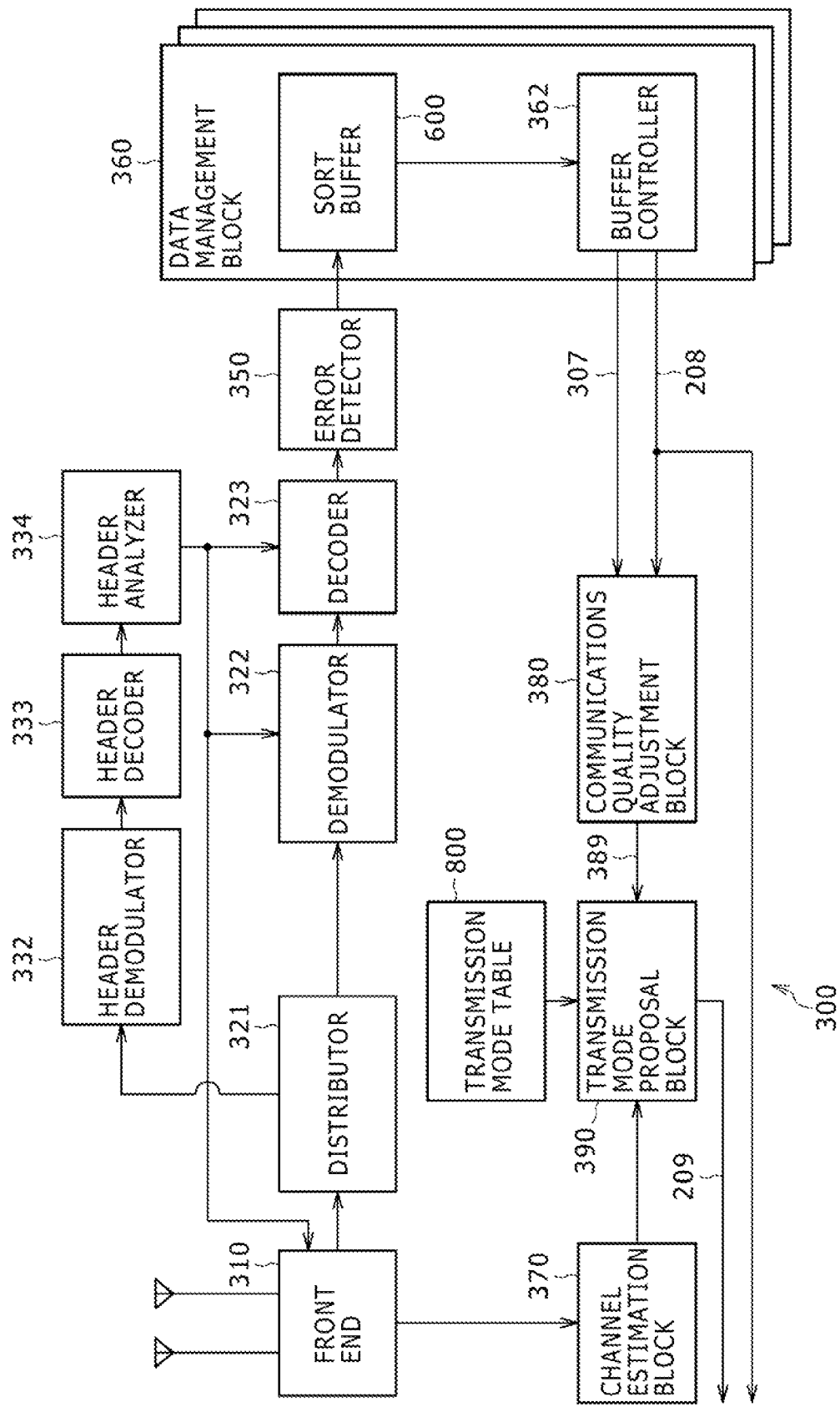
FIG. 9 is a block diagram illustrating a second exemplary configuration of a communications apparatus of a receiver side in the above-mentioned embodiment of the invention.

Referring to FIG. 9, there is shown an exemplary configuration of the communications apparatus 300 on the receiver side in the present embodiment. The communications apparatus 300 has a front end 310, a distributor 321, a demodulator 322, a decoder 323, a header demodulator 332, a header decoder 333, a header analyzer 334, an error detector 350, a data management block 360, a channel estimation block 370, a communications quality adjustment block 380, a transmission mode proposal block 390, and a transmission mode table 800.

The front end 310 receives a data signal from the communications apparatus 100 and resolves the received data signal for each stream. The distributor 321 distributes the signals resolved for streams to a header part and a payload part.

The header demodulator 332 demodulates the header part. The header decoder 333 decodes the demodulated header part. The header analyzer 334 extracts the transmission mode from the decoded header part and analyzes the extracted transmission mode.

The demodulator 322 demodulates the payload part. The decoder 323 decodes the demodulated signal. The front end 310, the demodulator 322 and the decoder 323 execute operations thereof in accordance with the transmission mode analyzed by the header analyzer 334.

The error detector 350 executes data error check by use of a CRC (Cyclic Redundancy Check) code added to the data in the payload. The channel estimation block 370 estimates the quality of the propagation path of each stream.

The data management block 360 manages the received data signals for each of the transmitting communications apparatus. The data management block 360 has a sort buffer 600 and a buffer controller 362 for each transmitting communications apparatus. The sort buffer 600 sorts the received packets in the order of transmission and holds a failed packet and subsequent packets. Contents of the sort buffer 600 will be described later. The buffer controller 362 feeds back information about successful reception (ACK) or failed reception (NACK) for each block (made up of 128 packets for example) to the transmitting side as a retransmission request signal 208.

The transmission mode table 800 holds combinations of transmission modes for each stream as described with reference to FIG. 4.

The transmission mode proposal block 390 selects, on the basis of the SNR estimated by the channel estimation block 370, a proper transmission mode from among those held in the transmission mode table 800 and proposes the selected transmission mode to the communications apparatus 100. In selecting a transmission mode, the transmission mode proposal block 390 compares the SNR estimated by the channel estimation block 370 with a threshold value set for each transmission mode with reference to the SNR required for application of each transmission mode, thereby selecting a transmission mode having the highest required SNR of the transmission modes whose estimated SNRs are in excess of the threshold value. In transmission modes having higher required SNRs, the transmission is executed at higher transfer rates.

The communications quality adjustment block 380 adjusts a threshold value to be used in the selection of a transmission mode by the transmission mode proposal block 290 and adjusts QoS so as to transmit retransmission data at a higher probability. The communications quality adjustment block 380 predicts a probability at which next data is retransmitted on the basis of the information (the retransmission request signal 208) indicative of success or failure of the reception in units of block in the reception block 362, thereby executing threshold value adjustment and QoS adjustment. In this processing, a condition of the sort buffer 600 is also taken into consideration.

Referring to FIG. 10, there is shown an exemplary configuration of the sort buffer 600 in the present embodiment. The sort buffer 600 is made up of two or more entries, each entry having a reception success/fail flag 610, a packet number 620, and data 630. Each entry corresponds to one packet.

The reception success/fail flag 610 is indicative whether or not the reception of a corresponding packet has been successful. For example, "1" is set for successful reception and "0" is set for failed reception. The packet number 620 is a number assigned to each corresponding packet in the order of transmission. In the sort buffer 600, the packet numbers are managed in the ascending order. The data 630 holds the contents of each corresponding packet.

With the sort buffer 600, the upper side in the figure is indicative of old entries. In this example, the reception failed for the start entry, the subsequent seven entries being successful in reception. Therefore, if the reception of the packet corresponding to the start entry is successful, all subsequent seven entries can be freed. So, in such a situation, if the retransmission probability of data is low, the threshold value is adjusted so as to make communication easily successful.

Figure 11:
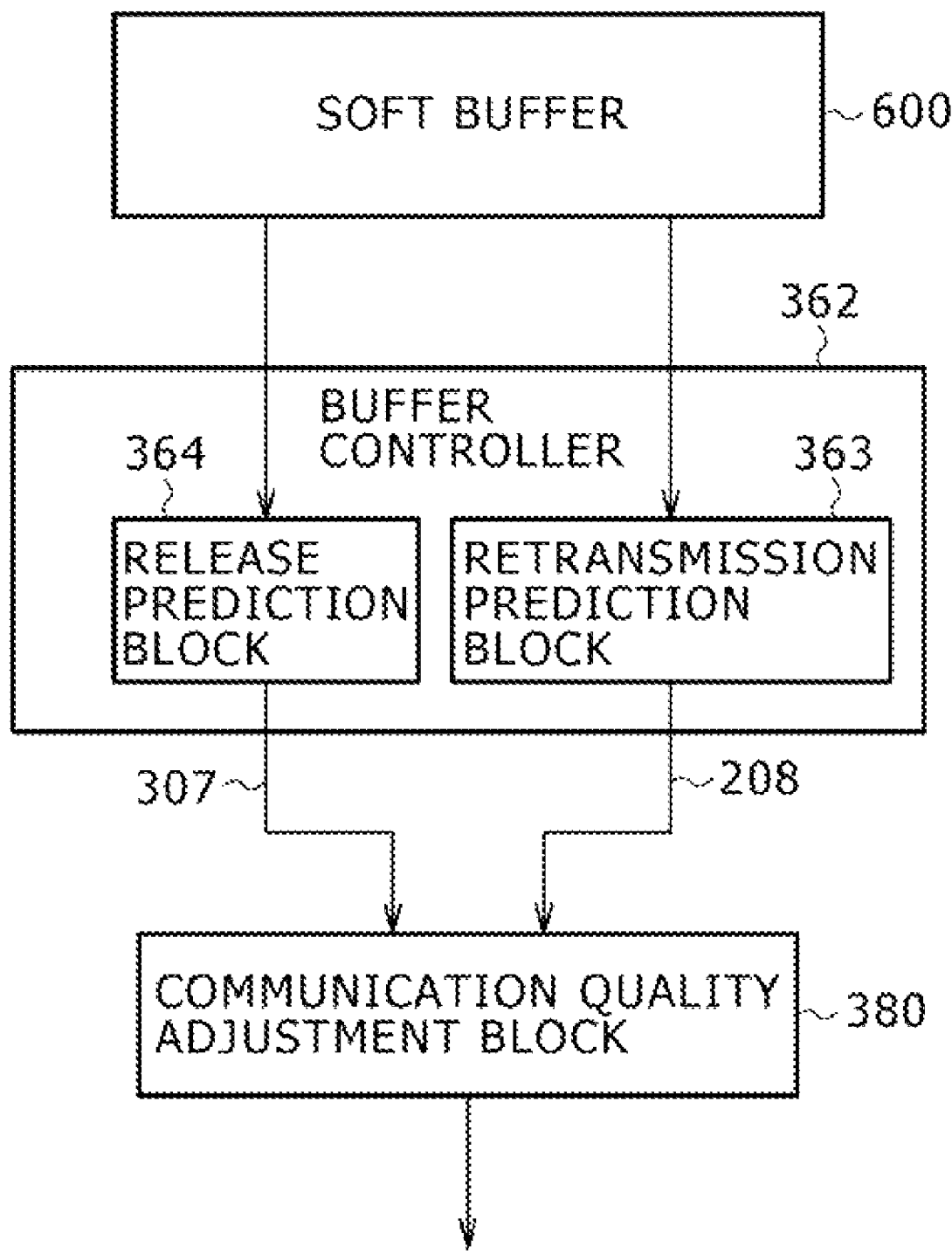
FIG. 11 is a block diagram illustrating the major part of the second exemplary configuration of the communications apparatus of the receiver side in the above-mentioned embodiment of the invention.

Referring to FIG. 11, there is shown a major portion of a second exemplary configuration of the communications apparatus 300 on the receiver side in the present invention. A buffer controller 362 has a retransmission prediction block 363, and a release prediction 364.

The retransmission prediction block 363 generates information indicative of the success or failed reception in units of block as a retransmission request signal 208 on the basis of the reception condition of each packet. Namely, the retransmission prediction block 363 generates, as a BER (Block Error Rate) a number obtained by dividing the number of errors in each block by a block size.

The release prediction block 364 analyzes the release possibility of each entry on the basis of the reception success/fail flag 610 of the sort buffer 600. As shown in the example of FIG. 10, if the reception has failed for the start but the subsequent entries are continuously successful in reception, it is predicted that the success of the next reception would release many entries. Therefore, the release prediction block 364 counts how many reception success/fail flags 610 in the sort buffer 600 that are indicative of successful reception. This may be the numbers continued from the entry immediately after the start entry as in the above-mentioned example or the maximum continuous numbers of successful reception in the sort buffer 600.

If the BER generated by the retransmission prediction block 363 is greater than predetermined threshold value Th_a, then the communications quality adjustment block 380 estimates that the probability at which the retransmission of next data is high, sets the packet error ratio PER targeted by QoS to "0", and increases the threshold value by X dB so as to increase the required SNR. In addition, if the block error ratio BER generated by the retransmission prediction block 363 is smaller than threshold value Th_a and greater than predetermined threshold value Th-b, then the communications quality adjustment block 380 estimates that the probability at which next data is retransmitted is medium, sets packet error ratio PER targeted by QoS to 1/10 of the original value, and increases the threshold value by Y dB so as to increase the predetermined SNR, where, Th_a>Th_b and X>Y.

Also, if the block error ratio BER generated by the retransmission prediction block 363 is smaller than threshold value Th_b, then the communications quality adjustment block 380 estimates that the probability at which next data is retransmitted is low and sets the packet error ratio PER targeted by the QoS to a usual value. However, if, as a result of the analysis by the release prediction block 364, it is possible for a predetermined amount of entries in the sort buffer 600 to be released in bulk, then the communications quality adjustment block 380 increases the threshold value by Y dB so as to increase the required SNR.

Figure 12:
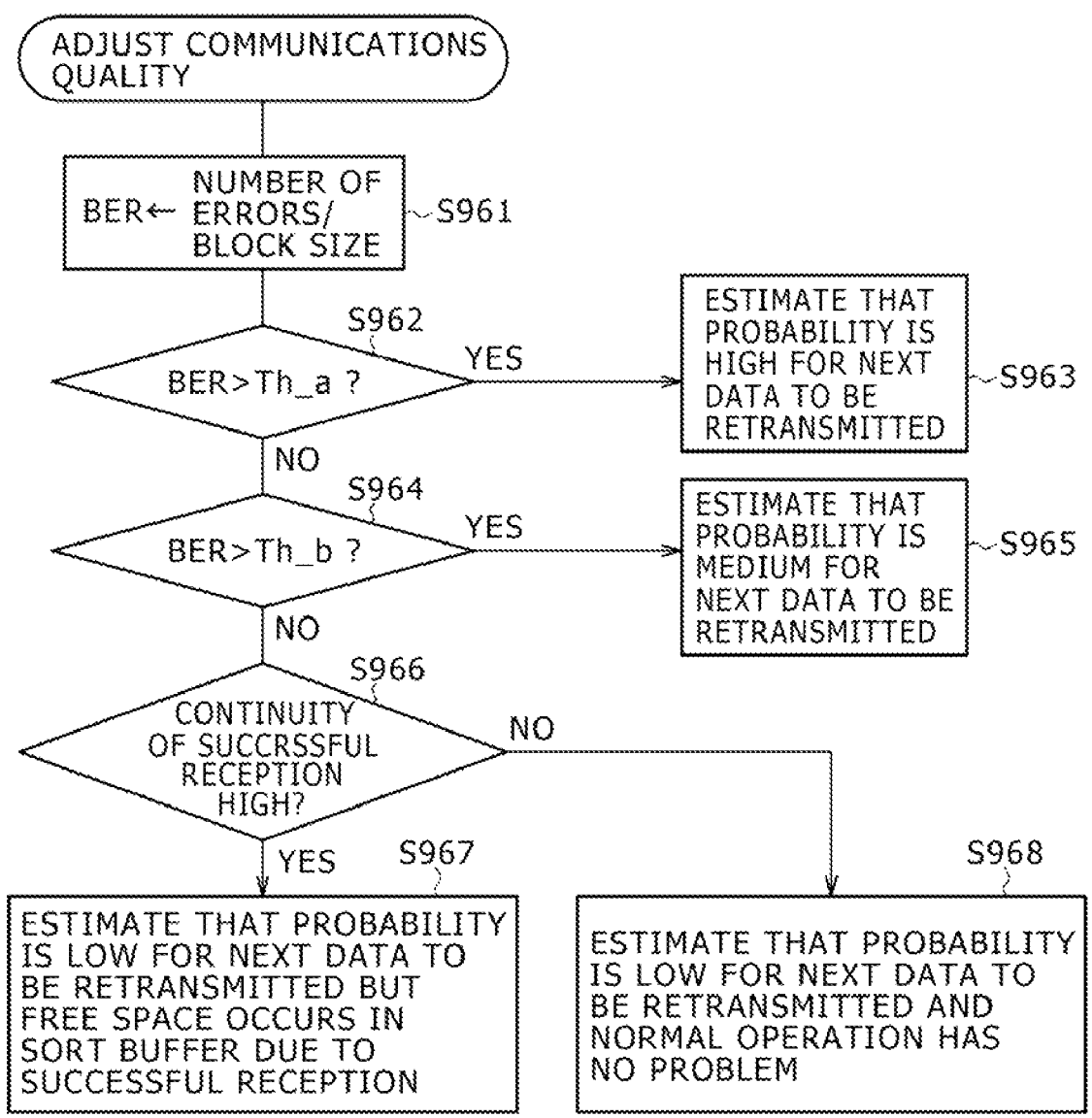
FIG. 12 is a flowchart indicative of an exemplary processing procedure of communications quality adjustment of the communications apparatus 300 practiced as a second embodiment of the invention.

Referring to FIG. 12, there is shown a flowchart indicative of a processing procedure of communications quality adjustment according to the second embodiment of the communications apparatus 300 in the present embodiment. It should be noted that this communications quality adjustment is equivalent to the threshold adjustment (step S930) in the first embodiment. The whole processing procedure is substantially the same as that shown in FIG. 7, so that the description thereof will be skipped.

The retransmission prediction block 363 generates, as a block error ratio BER, a value obtained by dividing the number of errors in block by a block size (step S961). If the block error ratio BER generated by the retransmission prediction block 363 is greater than predetermined threshold Th_a (step S962), the communications quality adjustment block 380 estimates that the probability at which next data is retransmitted is high (step S963), sets the packet error ratio PER targeted by QoS to "0", and increases the threshold value by X dB so as to increase the required SNR.

If the block error ratio BER generated by the retransmission prediction block 363 is smaller than threshold value Th_a and greater than the predetermined threshold Th_b (step S964), then the communications quality adjustment block 380 estimates that the probability at which next data is retransmission is medium (step S965), sets the packet error ratio PER targeted by QoS to 1/10 of the original value, and increases the threshold value by Y dB so as to increase the required SNR.

If the block error ratio BER generated by the retransmission prediction block 363 is smaller than threshold value Th_b (step S964), then the communications quality adjustment block 380 estimates that the probability at which next data is retransmitted is low (step S968) and sets the packet error ratio PER targeted by QoS to a usual value. However, if, as a result of the analysis by the release prediction block 364, the reception success/fail flag 610 in the sort buffer 600 is continuously indicative of successful reception (step S966), then the communications quality adjustment block 380 estimates that the probability at which a predetermined amount of entries of the sort buffer 600 are released in bulk (step S967) and increases the threshold value by Y dB so as to increase the required SNR.

As described and according to the second exemplary configuration in the present embodiment, the communications quality adjustment block 380 executes threshold and QoS adjustment in accordance with the retransmission ratio predicted by the retransmission prediction block 363 and the releasability predicted by the release prediction block 364, thereby correctly following the changes of propagation path conditions.

While preferred embodiments of the present invention have been described using specific terms, such description is for illustrative purpose only, and it is to be understood that changes and variations may be made without departing from the spirit or scope of the following claims.

To be more specific, in claims 1 and 2 attached hereto, a transmission mode table corresponds to the transmission mode table 600, for example. A propagation path condition detecting means corresponds to the channel estimation block 270. A transmission mode extraction means corresponds to the header analyzer 230. A threshold adjustment means corresponds to the threshold adjustment block 280, for example. A transmission mode proposal means corresponds to the transmission mode proposal block 290, for example.

In claims 3 attached hereto, a payload reception determination means corresponds to the payload reception decision block 251, for example.

In claim 4 attached hereto, a header reception determination means corresponds to the header reception decision block 232, for example.

In claims 5 and 6 attached hereto, a propagation path condition detecting procedure corresponds to step S923, for example. A transmission mode extraction procedure corresponds to step S924, for example. A threshold adjustment procedure corresponds to step S930, for example. A proposal procedure corresponds to step S926, for example.

In claims 7 and 8 attached hereto, a transmission mode table corresponds to the transmission mode table 800, for example. A propagation path condition detecting means corresponds to the channel estimation block 370, for example. The retransmission probability prediction means corresponds to the channel estimation block 370, for example. A threshold adjustment means corresponds to the communications quality adjustment block 380, for example. A transmission mode proposal means corresponds to the transmission mode proposal block 390, for example.

In claim 11 attached hereto, a buffer corresponds to the sort buffer 600, for example.

In claims 12 and 13 attached hereto, a propagation path condition detecting procedure corresponds to step S923, for example. A retransmission probability prediction procedure corresponds to steps S962 and S964. A threshold adjustment procedure corresponds to steps S963, S965, and S967. A proposal procedure corresponds to step S926.

It should be noted that the processing procedures described in the embodiments of the invention may be understood as a method including these procedures or as a program or programs for making a computer execute a sequence of these procedures or a recording media that stores these programs.

What is claimed is:

1. A communications system having a transmission apparatus for transmitting a signal and a reception apparatus for receiving said signal, said reception apparatus comprising:

a transmission mode table for holding, as transmission modes, a plurality of combinations of a modulating scheme and a coding ratio to be applied to said signal transmitted from said transmission apparatus;

propagation path condition detecting means for detecting a condition of propagation path with said transmission apparatus;

transmission mode extraction means for extracting a transmission mode transmitted from said transmission apparatus;

threshold adjustment means for adjusting a threshold value of said propagation path condition at the time of selecting a transmission mode to be proposed next in accordance with a difference between said extracted transmission mode and a transmission mode proposed last; and transmission mode proposal means for selecting a proper transmission mode from among transmission modes held in said transmission mode table on the basis of a relation between said propagation path condition and said threshold value and proposing said selected transmission mode to said transmission apparatus.

2. A reception apparatus comprising:

a transmission mode table for holding, as transmission modes, a plurality of combinations of a modulating scheme and a coding ratio to be applied to a signal transmitted from a transmission apparatus;

propagation path condition detecting means for detecting a condition of propagation path with said transmission apparatus;

transmission mode extraction means for extracting a transmission mode transmitted from said transmission apparatus;

threshold adjustment means for adjusting a threshold value of said propagation path condition at the time of selecting a transmission mode to be proposed next in accordance with a difference between said extracted transmission mode and a transmission mode proposed last; and transmission mode proposal means for selecting a proper transmission mode from among transmission modes held in said transmission mode table on the basis of a relation between said propagation path condition and said threshold value and proposing said selected transmission mode to said transmission apparatus.

3. The reception apparatus according to claim 2, further comprising:

payload reception determination means for determining a reception status of a payload part of said signal transmitted from said transmission apparatus, wherein said threshold adjustment means decreases said threshold value by a predetermined level, if, when the reception of said payload part is successful, said transmission mode extracted by said transmission mode extraction means is faster than said transmission mode proposed by said transmission mode proposal means, and increases said threshold value by a predetermined level, if, when the reception of said payload part fails, the transmission mode extracted by said transmission mode extraction means is not faster than the transmission mode proposed by said transmission mode proposal means.

4. The reception apparatus according to claim 3, further comprising:
  header reception determination means for determining a reception status of a header part for said signal transmitted from said transmission apparatus,
  wherein said threshold adjustment means, if the reception of said header part fails, adjusts said threshold value regardless of the reception status of said payload part.

5. A transmission mode proposal method for a reception apparatus having a transmission mode table for holding, as transmission modes, a plurality of combinations of a modulating scheme and a coding ratio to be applied to a signal transmitted from a transmission apparatus, comprising the steps of:
  detecting a condition of propagation path with said transmission apparatus;
  extracting a transmission mode transmitted from said transmission apparatus;
  adjusting a threshold value of said propagation path condition at the time of selecting a transmission mode to be proposed next in accordance with a difference between said extracted transmission mode and a transmission mode proposed last; and
  selecting a proper transmission mode from among transmission modes held in said transmission mode table on the basis of a relation between said propagation path condition and said threshold value and proposing said selected transmission mode to said transmission apparatus.

6. A non-transitory recording medium storing a program for a reception apparatus having a transmission mode table for holding, as transmission modes, a plurality of combinations of a modulating scheme and a coding ratio to be applied to a signal transmitted from a transmission apparatus, said program, when executed by a computer, causing the computer to perform the steps of:
  detecting a condition of propagation path with said transmission apparatus;
  extracting a transmission mode transmitted from said transmission apparatus;
  adjusting a threshold value of said propagation path condition at the time of selecting a transmission mode to be proposed next in accordance with a difference between said extracted transmission mode and a transmission mode proposed last; and
  selecting a proper transmission mode from among transmission modes held in said transmission mode table on the basis of a relation between said propagation path condition and said threshold value and proposing said selected transmission mode to said transmission apparatus.

7. A communications system having a transmission apparatus for transmitting a signal and a reception apparatus for receiving said signal,
  said reception apparatus comprising:
  a transmission mode table for holding, as transmission modes, a plurality of combinations of a modulating scheme and a coding ratio to be applied to said signal transmitted from said transmission apparatus;
  propagation path condition detecting means for detecting a condition of propagation path with said transmission apparatus;
  retransmission probability prediction means for predicting a probability of retransmission of a signal to be transmitted next from a log of received signals transmitted from said transmission apparatus;
  threshold adjustment means for adjusting a threshold value of said propagation path condition at the time of selecting a transmission mode to be proposed next on the basis of said retransmission probability; and
  transmission mode proposal means for selecting a proper transmission mode from among transmission modes held in said transmission mode table on the basis of a relation between said propagation path condition and said threshold value and proposing said selected transmission mode to said transmission apparatus.

8. A reception apparatus comprising:
  a transmission mode table for holding, as transmission modes, a plurality of combinations of a modulating scheme and a coding ratio to be applied to a signal transmitted from a transmission apparatus;
  propagation path condition detecting means for detecting a condition of propagation path with said transmission apparatus;
  retransmission probability prediction means for predicting a probability of retransmission of a signal to be transmitted next from a log of received signals transmitted from said transmission apparatus;
  threshold adjustment means for adjusting a threshold value of said propagation path condition at the time of selecting a transmission mode to be proposed next on the basis of said retransmission probability; and
  transmission mode proposal means for selecting a proper transmission mode from among transmission modes held in said transmission mode table on the basis of a relation between said propagation path condition and said threshold value and proposing said selected transmission mode to said transmission apparatus.

9. The reception apparatus according to claim 8, wherein said retransmission probability prediction means predicts said retransmission probability with reference to an error ratio in units of a predetermined block of said signal transmitted from said transmission apparatus.

10. The reception apparatus according to claim 8, wherein, if said retransmission probability is found higher than a predetermined level, said threshold adjustment means increases the said threshold value.

11. The reception apparatus according to claim 10, further comprising:
  a buffer for holding the signal transmitted from said transmission apparatus into each entry in accordance with a transmission sequence,
  wherein, if said retransmission probability is found not higher than a predetermined ratio but if the number of continuous entries in a queue to be released in said buffer is higher than a predetermined number, then said threshold adjustment means increases said threshold value.

12. A transmission mode proposal method for a reception apparatus having a transmission mode table for holding, as transmission modes, a plurality of combinations of a modulating scheme and a coding ratio to be applied to a signal transmitted from a transmission apparatus, comprising the steps of:
  detecting a condition of propagation path with said transmission apparatus;
  predicting a probability of retransmission of a signal to be transmitted next from a log of received signals transmitted from said transmission apparatus;
  adjusting a threshold value of said propagation path condition at the time of selecting a transmission mode to be proposed next on the basis of said retransmission probability; and selecting a proper transmission mode from among transmission modes held in said transmission mode table on the basis of a relation between said propagation path condition and said threshold value and proposing said selected transmission mode to said transmission apparatus.

13. A non-transitory recording medium storing a program for a reception apparatus having a transmission mode table for holding, as transmission modes, a plurality of combinations of a modulating scheme and a coding ratio to be applied to a signal transmitted from a transmission apparatus, said program, when executed by a computer, causing the computer to perform the steps of:

detecting a condition of propagation path with said transmission apparatus;

predicting a probability of retransmission of a signal to be transmitted next from a log of received signals transmitted from said transmission apparatus;

adjusting a threshold value of said propagation path condition at the time of selecting a transmission mode to be proposed next on the basis of said retransmission probability; and selecting a proper transmission mode from among transmission modes held in said transmission mode table on the basis of a relation between said propagation path condition and said threshold value and proposing said selected transmission mode to said transmission apparatus.

\* \* \* \* \*